United States Patent
Xiao et al.

(10) Patent No.: US 11,982,914 B2
(45) Date of Patent: May 14, 2024

(54) ARRAY SUBSTRATE AND DISPLAY PANEL

(71) Applicant: TCL China Star Optoelectronics Technology Co., Ltd., Guangdong (CN)

(72) Inventors: Juncheng Xiao, Guangdong (CN); Ji Li, Guangdong (CN); Fen Long, Guangdong (CN); Yingchun Zhao, Guangdong (CN); Ru Ge, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/614,389

(22) PCT Filed: Nov. 5, 2021

(86) PCT No.: PCT/CN2021/128862
§ 371 (c)(1),
(2) Date: Nov. 26, 2021

(87) PCT Pub. No.: WO2023/070725
PCT Pub. Date: May 4, 2023

(65) Prior Publication Data
US 2024/0027862 A1    Jan. 25, 2024

(30) Foreign Application Priority Data
Oct. 27, 2021   (CN) .......................... 202111264075.7

(51) Int. Cl.
*G02F 1/1368* (2006.01)
*G02F 1/1343* (2006.01)
*G02F 1/1362* (2006.01)

(52) U.S. Cl.
CPC ...... *G02F 1/1368* (2013.01); *G02F 1/134309* (2013.01); *G02F 1/136286* (2013.01)

(58) Field of Classification Search
CPC ......... G02F 1/136286; G02F 1/134309; G02F 1/1368
See application file for complete search history.

(56) References Cited

U.S. PATENT DOCUMENTS 9,170,449 B2   10/2015   Baek et al.
10,527,901 B2   1/2020   No et al.
(Continued)

FOREIGN PATENT DOCUMENTS

| CN | 104865763 | 8/2015 |
|----|-----------|--------|
| CN | 105093740 | 11/2015 |

(Continued)

OTHER PUBLICATIONS

Notice of Reasons for Refusal dated Dec. 26, 2023 From the Japan Patent Office Re. Application No. 2021-568340 and Its Translation Into English. (8 Pages).

(Continued)

*Primary Examiner* — Mariam Qureshi

(57) ABSTRACT

The present application relates to an array substrate and a display panel. In the present application, a first common line and a first sharing line are respectively disposed on two sides of a scan line, thereby preventing a situation in the prior art that the first sharing line penetrates a main pixel region and a sub-pixel region vertically, thereby improving an aperture ratio and a transmittance of the array substrate. The first common line, the first sharing line, and the scan line are disposed in a same layer, thereby further improving the transmittance of the array substrate.

12 Claims, 9 Drawing Sheets

(56) References Cited

U.S. PATENT DOCUMENTS

| | | | |
|---|---|---|---|
| 2010/0060838 A1 | 3/2010 | Kim et al. | |
| 2013/0002625 A1 | 1/2013 | Liao et al. | |
| 2017/0153508 A1* | 6/2017 | Huang | G02F 1/136213 |
| 2017/0176817 A1* | 6/2017 | Tseng | G02F 1/13394 |
| 2021/0335829 A1* | 10/2021 | Yi | H01L 27/124 |

FOREIGN PATENT DOCUMENTS

| | | |
|---|---|---|
| CN | 105470269 | 4/2016 |
| CN | 110187539 | 8/2019 |
| CN | 110931512 | 3/2020 |
| CN | 111208688 | 5/2020 |
| CN | 111258142 | 6/2020 |
| CN | 113485051 | 10/2021 |
| JP | 2014-146021 | 8/2014 |
| KR | 10-2017-0044226 | 4/2017 |
| WO | WO 2018/176565 | 10/2018 |

OTHER PUBLICATIONS

Notice of Submission of Opinion dated Dec. 15, 2015 From the Korean Intellectul Property Office Re. Application No. 10-2021-7038478 and Its Translation Into English. (10 Pages).

* cited by examiner

ARRAY SUBSTRATE AND DISPLAY PANEL

RELATED APPLICATIONS

This application is a National Phase of PCT Patent Application No. PCT/CN2021/128862 having International filing date of Nov. 5, 2021, which claims the benefit of priority of Chinese Patent Application No. 202111264075.7 filed on Oct. 27, 2021. The contents of the above applications are all incorporated by reference as if fully set forth herein in their entirety.

FIELD AND BACKGROUND OF THE INVENTION

The present disclosure relates to a field of display technology, in particular to an array substrate and a display panel.

At present, when a vertical alignment (VA) liquid crystal display panel is under different viewing angles, there is a large birefringence difference of liquid crystal molecules, and serious color shifting. A high vertical alignment (HVA) liquid crystal display panel requires a multi-domain display to decrease the color shifting. Based on electrical principles, a pixel unit is divided into a main pixel region and a sub-pixel region with different rotation angles of the liquid crystal molecules, and an eight-domain display can be realized by combining a four-domain on a physical structure.

Currently, in the eight-domain display, a main pixel electrode is controlled through a main pixel thin film transistor, and a sub-pixel electrode is jointly controlled through a sub-pixel thin film transistor and a sharing thin film transistor, so as to realize different potentials of the main pixel electrode and the sub-pixel electrode. This design can separately control a bias voltage of the sub-pixel electrode, so as to achieve low color shifting and residual image optimization.

As shown in FIGS. 1 and 2, a sharing electrode line 100' (share bar) of a current sharing thin film transistor penetrates through middle of a main pixel region and a sub-pixel region, thereby reducing a light transmission area of a pixel unit and reducing an aperture ratio of the pixel unit. A common line 200' of the current sharing thin film transistor is a first-layer metal wire, the sharing electrode line 100' is a second-layer metal wire, and the sharing electrode line 100' covers the common line 200', thereby reducing transmittance of the pixel unit.

SUMMARY OF THE INVENTION

The present disclosure aims to provide an array substrate and a display panel, which can solve problems in the prior art such as a low aperture ratio and a low transmittance of a pixel unit.

In order to solve the above problems, the present disclosure provides an array substrate, comprising a substrate and a plurality of pixel units arranged on the substrate in array; wherein each of the pixel units is divided into a main pixel region and a sub-pixel region; each of the pixel units comprises: a data line disposed between adjacent pixel units; a scan line disposed on the substrate and intersecting with the data line, wherein the scan line is located between the main pixel region and the sub-pixel region; a first common line disposed on the substrate and located at a side of the scan line close to the main pixel region and parallel to the scan line; and a first sharing line disposed on the substrate and located at a side of the scan line close to the sub-pixel region and parallel to the scan line.

In addition, the first common line, the first sharing line, and the scan line are disposed in a same layer.

In addition, each of the pixel units further comprises: a main pixel electrode disposed in the main pixel region, wherein the main pixel electrode comprises a first main electrode parallel to the data line; a sub-pixel electrode disposed in the sub-pixel region, wherein the sub-pixel electrode comprises a second main electrode parallel to the data line; a main pixel thin film transistor, wherein a gate of the main pixel thin film transistor is electrically connected to the scan line, a source of the main pixel thin film transistor is electrically connected to the data line, and a drain of the main pixel thin film transistor is electrically connected to the main pixel electrode; a sub-pixel thin film transistor, wherein a gate of the sub-pixel thin film transistor is electrically connected to the scan line, a source of the sub-pixel thin film transistor is electrically connected to the data line, and a drain of the sub-pixel thin film transistor is electrically connected to the sub-pixel electrode; and a sharing thin film transistor, wherein a gate of the sharing thin film transistor is electrically connected to the scan line, a source of the sharing thin film transistor is electrically connected to the drain of the sub-pixel thin film transistor, and a drain of the sharing thin film transistor is electrically connected to the first sharing line.

In addition, each of the pixel units further comprises: a second common line parallel to the data line, wherein one end of the second common line is electrically connected to the first common line, and another end of the second common line extends from the main pixel region of one of the pixel units to the sub-pixel region of an adjacent pixel unit along an extension direction of the data line.

In addition, the second common line comprises a first sub-common line, a second sub-common line, and a third sub-common line spaced apart from each other; in the main pixel region, the first sub-common line is disposed between the main pixel electrode and the data line, the second sub-common line is disposed at a side of the main pixel electrode away from the data line, and the third sub-common line is disposed corresponding to the first main electrode; and in the sub-pixel region, the first sub-common line is disposed between the sub-pixel electrode and the data line, the second sub-common line is disposed on the side of the sub-pixel electrode away from the data line, and the third sub-common line is disposed corresponding to the second main electrode.

In addition, each of the pixel units further comprises: a second sharing line parallel to the data line, wherein one end of the second sharing line is electrically connected to the first sharing line, and another end of the second sharing line extends from the sub-pixel region of one of the pixel units to the main pixel region of an adjacent pixel unit along an extension direction of the data line.

In addition, the second sharing line comprises a first sub-sharing line, a second sub-sharing line, and a third sub-sharing line spaced apart from each other; in the main pixel region, the first sub-sharing line is disposed between the main pixel electrode and the data line, the second sub-sharing line is disposed at a side of the main pixel electrode away from the data line, and the third sub-sharing line is disposed corresponding to the first main electrode; and in the sub-pixel region, the first sub-sharing line is disposed between the sub-pixel electrode and the data line, the second sub-sharing line is disposed at the side of the sub-pixel electrode away from the data line, and the third sub-sharing line is disposed corresponding to the second main electrode.

In addition, the scan line is disposed in a same layer with the second common line and the second sharing line.

In addition, in the main pixel region, the first main electrode is stacked on a side of the third sub-common line away from the substrate; and in the sub-pixel region, the second main electrode is stacked on the side of the third sub-common line away from the substrate; or in the main pixel region, the first main electrode is stacked on a side of the third sub-sharing line away from the substrate; and in the sub-pixel region, the second main electrode is stacked on the side of the third sub-sharing line away from the substrate.

In order to solve the above problems, the present disclosure provides a display panel, comprising an array substrate according to the present disclosure, a color film substrate disposed corresponding to the array substrate, and a liquid crystal layer disposed between the array substrate and the color film substrate.

In the present disclosure, the first common line and the first sharing line are respectively disposed on opposite sides of the scan line, thereby preventing a situation in the prior art that the first sharing line penetrates the main pixel region and the sub-pixel region vertically, thereby improving an aperture ratio and a transmittance of the array substrate. The first common line, the first sharing line, and the scan line are disposed in a same layer, thereby further improving the transmittance of the array substrate.

BRIEF DESCRIPTION OF THE SEVERAL VIEWS OF THE DRAWINGS

In order to more clearly explain technical solutions in embodiments of the present disclosure, the following will briefly introduce drawings required in the description of the embodiments. Obviously, the drawings in the following description are only some embodiments of the present disclosure. For those skilled in the art, without paying any creative work, other drawings can be obtained based on these drawings.

Figure 1:
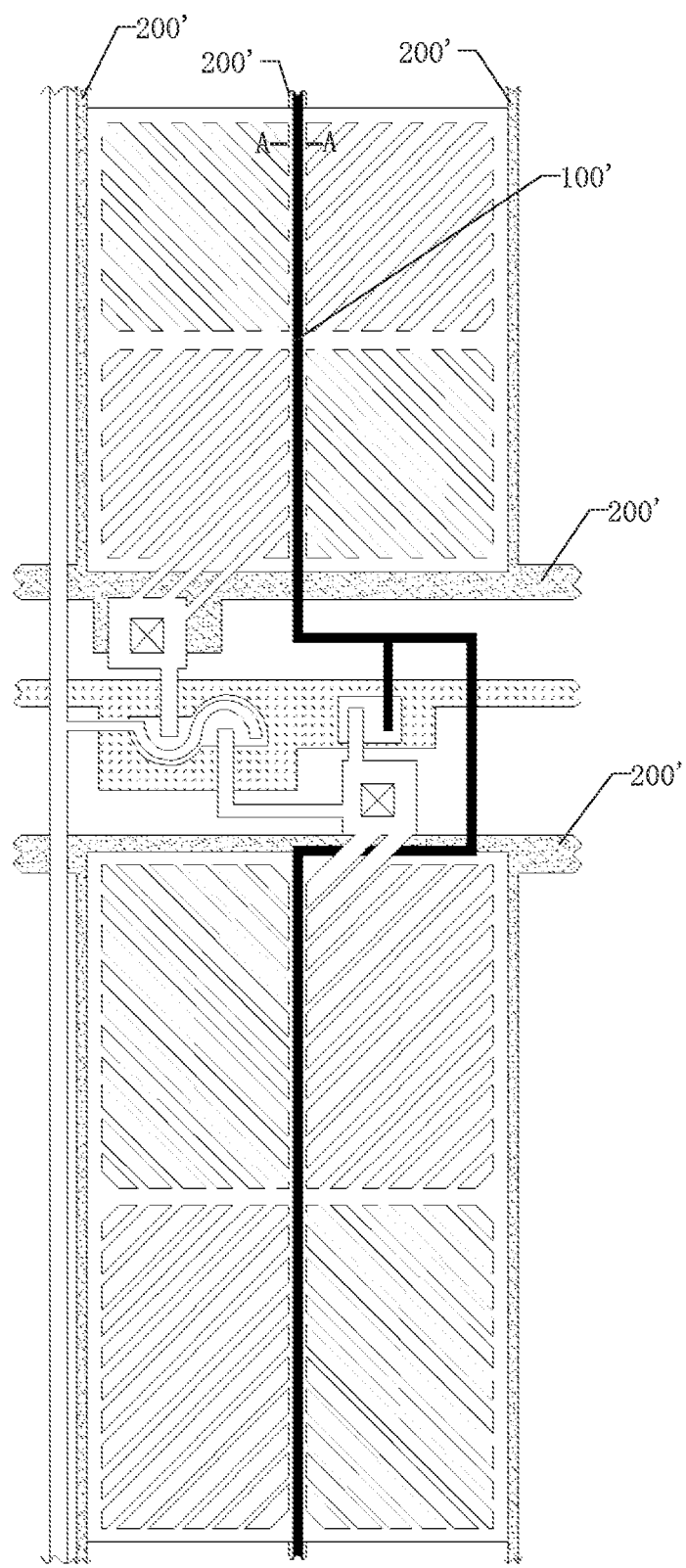
FIG. 1 is a schematic plan view of a pixel unit of an array substrate in the prior art.
Figure 2:
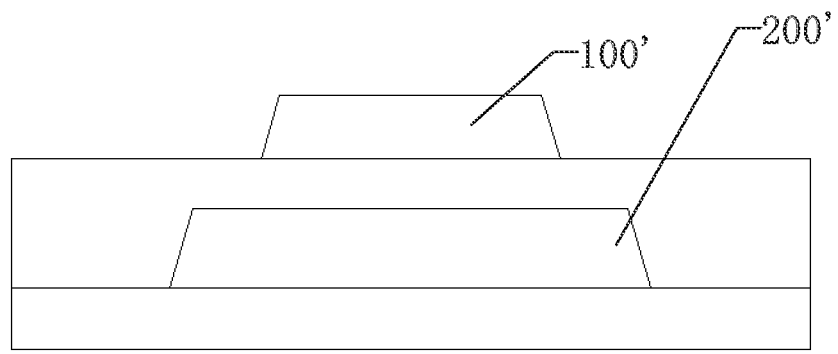
FIG. 2 is a cross-sectional view of A-A in FIG. 1.

REFERENCE NUMERALS 100, array substrate; 101, substrate;
102, pixel unit;
1021, main pixel region; 1022, sub-pixel region;
1, scan line; 2, first common line;
3, first sharing line; 4, data line;
5, main pixel electrode; 6, sub-pixel electrode;
7, main pixel thin film transistor; 8, sub-pixel thin film transistor;
9, sharing thin film transistor; 10, second common line;
11, second sharing line;
110, first sub-common line; 120, second sub-common line;
130, third sub-common line;
111, first sub-sharing line; 112, second sub-sharing line;
113, third sub-sharing line;
51, first main electrode; 61, second main electrode.

DESCRIPTION OF SPECIFIC EMBODIMENTS OF THE INVENTION

The following describes preferred embodiments of the present disclosure in detail with reference to accompanying drawings of the specification, to fully introduce technical contents of the present disclosure to those skilled in the art, to exemplify that the present disclosure can be practiced, so that the technical contents disclosed by the present disclosure is clearer, and those skilled in the art can more easily understand how to implement the present disclosure. However, the present disclosure can be embodied by many different forms of embodiments, the protection scope of the present disclosure is not limited to the embodiments mentioned here, and the description of the following embodiments is not intended to limit the scope of the present disclosure.

Directional terms mentioned in the present disclosure, such as [up], [down], [front], [back], [left], [right], [inner], [outer], [side], etc., are only directions of the attached drawings. The directional terms used in the present disclosure are used to describe and understand the present disclosure, rather than to limit the protection scope of the present disclosure.

In the drawings, elements of a same structure are denoted by a same numeral and components of similar structure or function are denoted by similar numerals. Further, for ease of understanding and description, dimensions and thickness of each component shown in the drawings are arbitrarily shown, and the present disclosure does not limit the dimensions and thickness of each component.

Embodiment 1

This embodiment provides a display panel. The display panel comprises an array substrate, a color film substrate disposed corresponding to the array substrate, and a liquid crystal layer disposed between the array substrate and the color film substrate.

Figure 3:
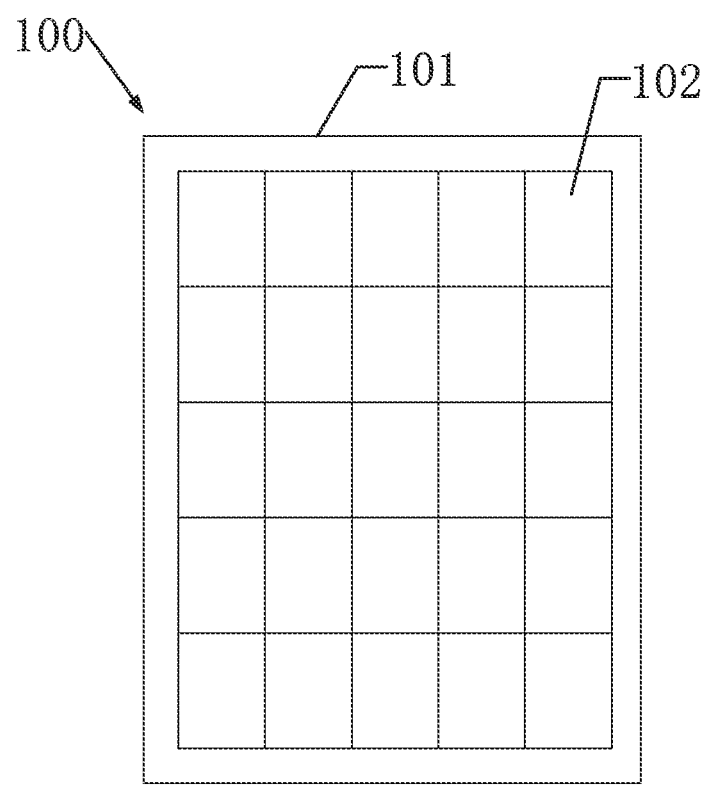
FIG. 3 is a schematic plan view of an array substrate according to Embodiment 1 of the present disclosure.

As shown in FIG. 3, the array substrate 100 comprises a substrate 101 and a plurality of pixel units 102 arranged on the substrate 101 in an array.

The substrate 101 is made of one or more of glass, polyimide, polycarbonate, polyethylene terephthalate, or polyethylene naphthalate. Therefore, the substrate 101 has better impact resistance and can effectively protect the display panel.

Figure 4:
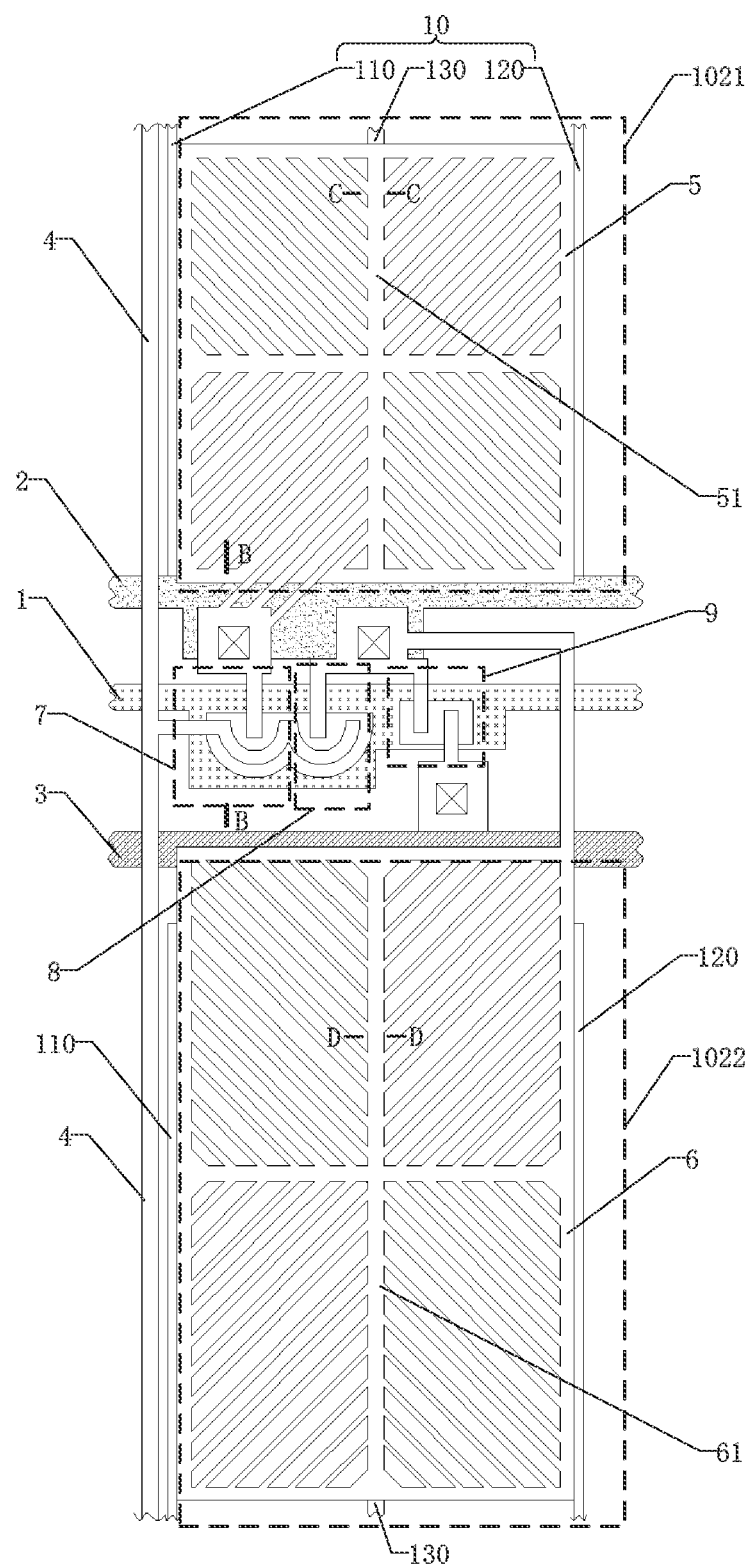
FIG. 4 is a schematic plan view of a pixel unit of the array substrate according to Embodiment 1 of the present disclosure.

As shown in FIG. 4, each of the pixel units 102 is divided into a main pixel region 1021 and a sub-pixel region 1022. Each of the pixel units 102 comprises a scan line 1, a first common line 2, a first sharing line 3, a data line 4, a main pixel electrode 5, a sub-pixel electrode 6, a main pixel thin film transistor 7, a sub-pixel thin film transistor 8, a sharing thin film transistor 9, and a second common line 10.

Figure 5:
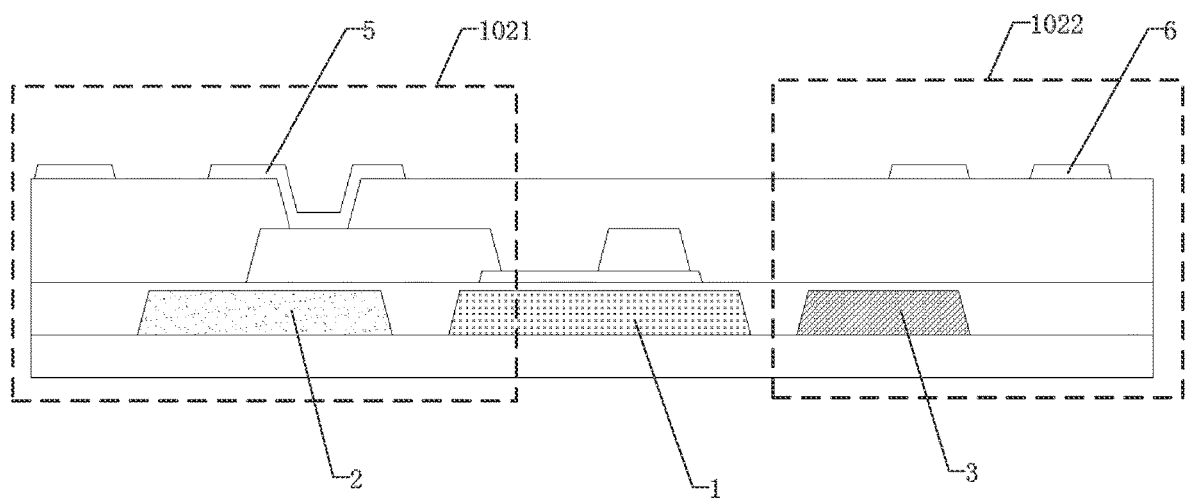
FIG. 5 is a cross-sectional view of B-B in FIG. 4.
Figure 6:
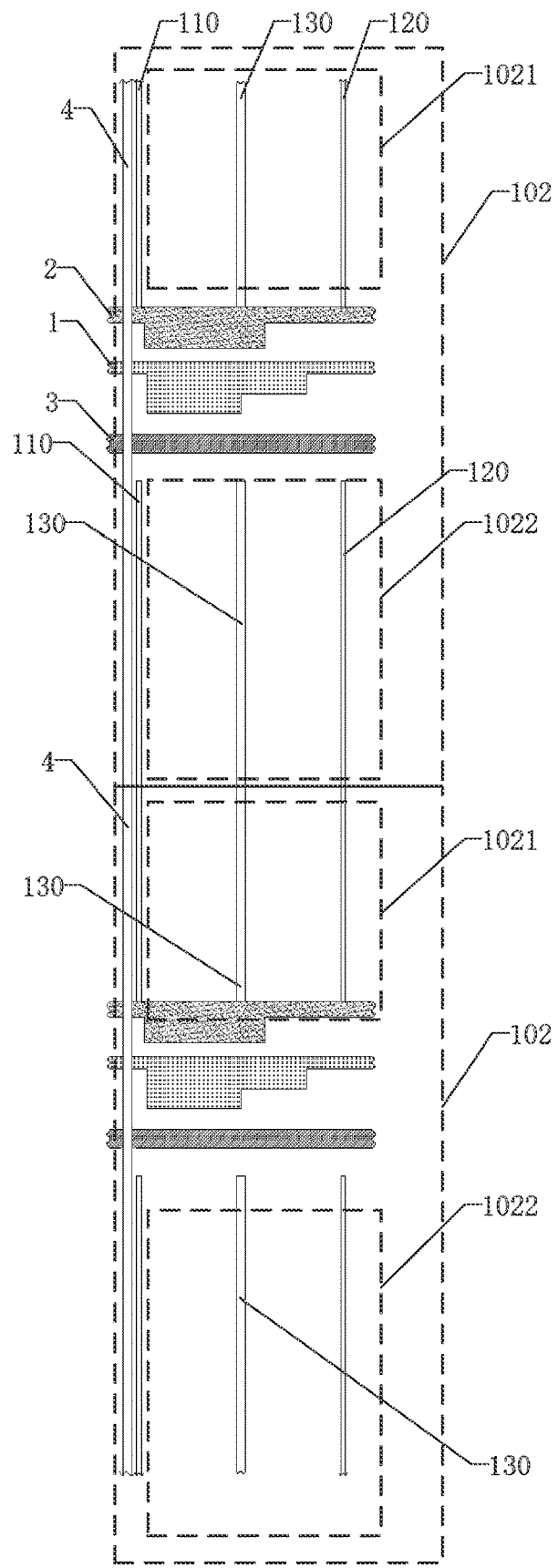
FIG. 6 is a schematic partial plan view of two pixel units of the array substrate according to Embodiment 1 of the present disclosure.

As shown in FIGS. 4, 5, and 6, the scan line 1 and the data line 4 are disposed on the substrate 101 and cross each other, and the scan line 1 is located between the main pixel region 1021 and the sub-pixel region 1022. In this embodiment, a material of the scan line 1 is metal. In other embodiments, materials of the scan line 1 may be other conductive materials, for example alloys, nitrides of metallic materials, oxides of metallic materials, nitrogen oxides of metallic materials, stacked layers of metallic materials and other conductive materials, or other suitable materials.

As shown in FIGS. 4, 5, and 6, the first common line 2 is disposed on the substrate 101 and located at a side of the scan line 1 close to the main pixel region 1021. The first common line 2 is parallel to the scan line 1 and spaced apart from the scan line 1. In this embodiment, a material of the first common line 2 is metal. In other embodiments, materials of the first common line 2 may be other conductive materials, for example, alloys, nitrides of metallic materials, oxides of metallic materials, nitrogen oxides of metallic materials, stacked layers of metallic materials and other conductive materials, or other suitable materials.

As shown in FIGS. 4, 5, and 6, the first sharing line 3 is disposed on the substrate 101 and spaced apart from the scan line 1 and located at a side of the scan line 1 close to sub-pixel region 1022. The first sharing line 3 is parallel to the scan line 1 and is disposed spaced apart from the scan line 1. In this embodiment, a material of the first sharing line 3 is metal. In other embodiments, materials of the first sharing line 3 may be other conductive materials, for example, alloys, nitrides of metallic materials, oxides of metallic materials, nitrogen oxides of metallic materials, stacked layers of metallic materials and other conductive materials, or other suitable materials.

Wherein the scan line 1, the first common line 2, and the first sharing line 3 are disposed in a same layer. In this embodiment, the scan line 1, the first common line 2, and the first sharing line 3 are made of a same material, so that the scan line 1, the first common line 2, and the first sharing line 3 can be simultaneously prepared and formed in one step, thereby saving processes and production cost.

In this embodiment, the first common line 2 and the first sharing line 3 are disposed on two sides of the scan line 1, respectively, so that a situation in the prior art that the first sharing line 100' penetrates the main pixel region 1021 and the sub-pixel region 1022 is prevented, thereby increasing an aperture ratio and a transmittance of the pixel units 102. The first common line 2, the first sharing line 3, and the scan line 1 are disposed in the same layer, thereby further improving the transmittance of the pixel units 102.

As shown in FIGS. 4 and 6, the data line 4 is disposed between adjacent pixel units 102 and intersects with the scan line 1. In other words, an extension direction of the data line 4 and an extension direction of the scan line 1 are not parallel. In this embodiment, the extension direction of the data line 4 and the extension direction of the scan line 1 are perpendicular to each other. In this embodiment, a material of the data line 4 is metal. In other embodiments, materials of the data line 4 may be other conductive materials, for example, alloys, nitrides of metallic materials, oxides of metallic materials, nitrogen oxides of metallic materials, stacked layers of metallic materials and other conductive materials, or other suitable materials.

Figure 7:
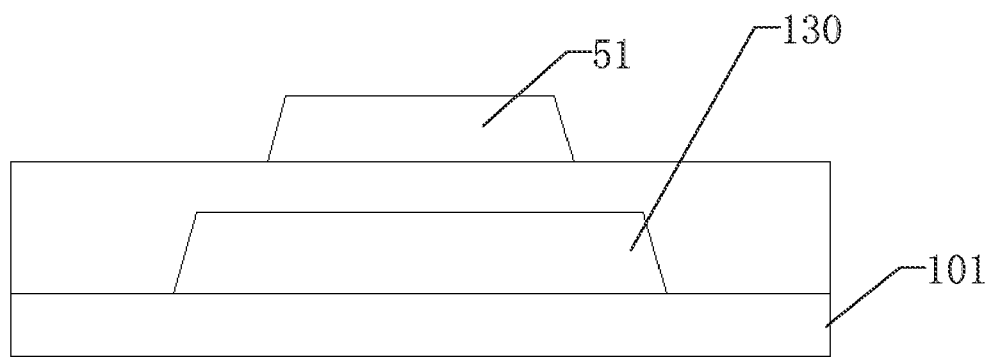
FIG. 7 is a cross-sectional view of C-C in FIG. 4.

As shown in FIGS. 4, 6, and 7, the main pixel electrode 5 is disposed in the main pixel region 1021. The main pixel electrode 5 comprises a first main electrode 51 parallel to the data line 4.

Figure 8:
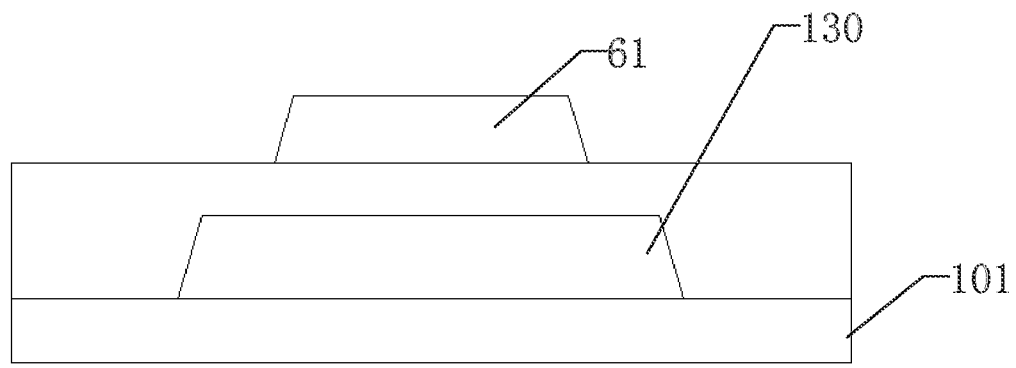
FIG. 8 is a cross-sectional view of D-D in FIG. 4.

As shown in FIGS. 4, 6, and 8, the sub-pixel electrode 6 is disposed in the sub-pixel region 1022. The sub-pixel electrode 6 comprises a second main electrode 61 parallel to the data line 4.

As shown in FIGS. 4 and 6, one end of the second common line 10 is electrically connected to the first common line 2, and another end of the second common line 10 extends from the main pixel region 1021 of one pixel unit 102 to the sub-pixel region 1022 of an adjacent pixel unit 102 along the extension direction of the data line 4. The second common line 10 is parallel to the data line 4 and spaced apart from the data line 4. Wherein the second common line 10 is disposed in a same layer with the scan line 1, the first common line 2, and the first sharing line 3.

As shown in FIGS. 4 and 6, the second common line 10 comprises a first sub-common line 110, a second sub-common line 120, and a third sub-common line 130 spaced apart from each other.

As shown in FIGS. 4, 6 and 7, in the main pixel region 1021, the first sub-common line 110 is disposed between the main pixel electrode 5 and the data line 4, the second sub-common line 120 is disposed on a side of the main pixel electrode away from the data line 4, and the third sub-common line 130 is disposed corresponding to the first main electrode 51. In the main pixel region 1021, the first main electrode 51 is stacked on a side of the third sub-common line 130 away from the substrate 101. Therefore, it is possible to prevent additional occupation of a light transmission area of the array substrate 100 and improve the aperture ratio of the array substrate 100.

As shown in FIGS. 4, 6 and 8, in the sub-pixel region 1022, the first sub-common line 110 is disposed between the sub-pixel electrode 6 and the data line 4, the second sub-common line 120 is disposed on a side of the sub-pixel electrode 6 away from the data line 4, and the third sub-common line 130 is disposed corresponding to the second main electrode 61. In the sub-pixel region 1022, the second main electrode 61 is stacked on the side of the third sub-common line 130 away from the substrate 101. Thus, it is possible to prevent addition occupation of the light transmission area of the array substrate 100 and improve the aperture ratio of the array substrate 100.

Figure 9:
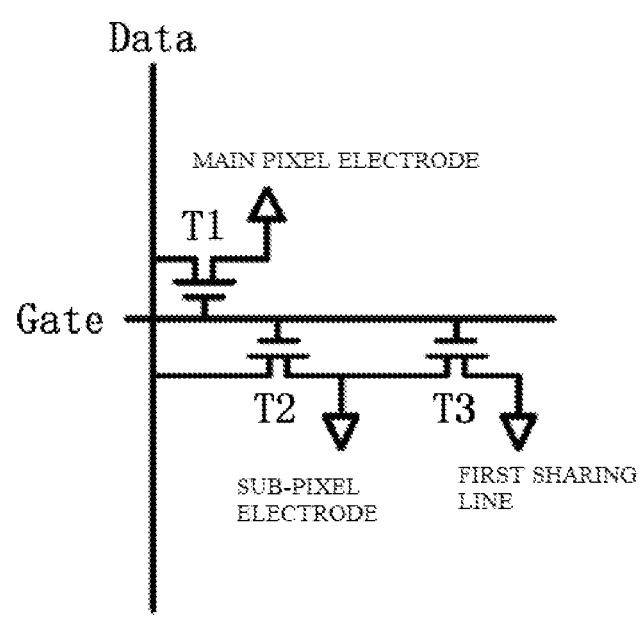
FIG. 9 is a driving circuit diagram of the array substrate according to Embodiment 1 of the present disclosure.

As shown in FIGS. 4 and 9, a gate of the main pixel thin film transistor 7 (i.e., T1 in FIG. 9) is electrically connected to the scan line 1 (i.e., Gate in FIG. 9), a source of the main pixel thin film transistor 7 (i.e. T1 in FIG. 9) is electrically connected to the data line 4 (i.e. Data in FIG. 9), and a drain of the main pixel thin film transistor 7 (i.e. T1 in FIG. 9) is electrically connected to the main pixel electrode 5.

As shown in FIGS. 4 and 9, a gate of the sub-pixel thin film transistor 8 (i.e., T2 in FIG. 9) is electrically connected to the scan line 1 (i.e., Gate in FIG. 9), a source of the sub-pixel thin film transistor 8 (i.e. T2 in FIG. 9) is electrically connected to the data line 4 (i.e. Data in FIG. 9), and a drain of the sub-pixel thin film transistor 8 (i.e. T2 in FIG. 9) is electrically connected to the sub-pixel electrode 6.

As shown in FIGS. 4 and 9, a gate of the sharing thin film transistor 9 (i.e., T3 in FIG. 9) is electrically connected to the scan line 1 (i.e., Gate in FIG. 9), a source of the sharing thin film transistor 9 (i.e. T3 in FIG. 9) is electrically connected to the drain of the sub-pixel thin film transistor 8 (i.e. T2 in FIG. 9), and a drain of the sharing thin film transistor 9 (i.e. T3 in FIG. 9) is electrically connected to the first sharing line 3.

Wherein the gate of the main pixel thin film transistor 7, the gate of the sub-pixel thin film transistor 8, and the gate of the sharing thin film transistor 9 are electrically connected to a same scan line 1. The source of the main pixel thin film transistor 7 and the source of the sub-pixel thin film transistor 8 are electrically connected to a same data line 4.

Embodiment 2

As shown in FIGS. 10-13, Embodiment 2 includes most technical features of Embodiment 1. Differences between Embodiment 2 and Embodiment 1 lies in that the second common line 10 in Embodiment 1 is removed from Embodiment 2, and a second sharing line 11 is disposed at a position of the second common line 10 in Embodiment 1.

Figure 10:
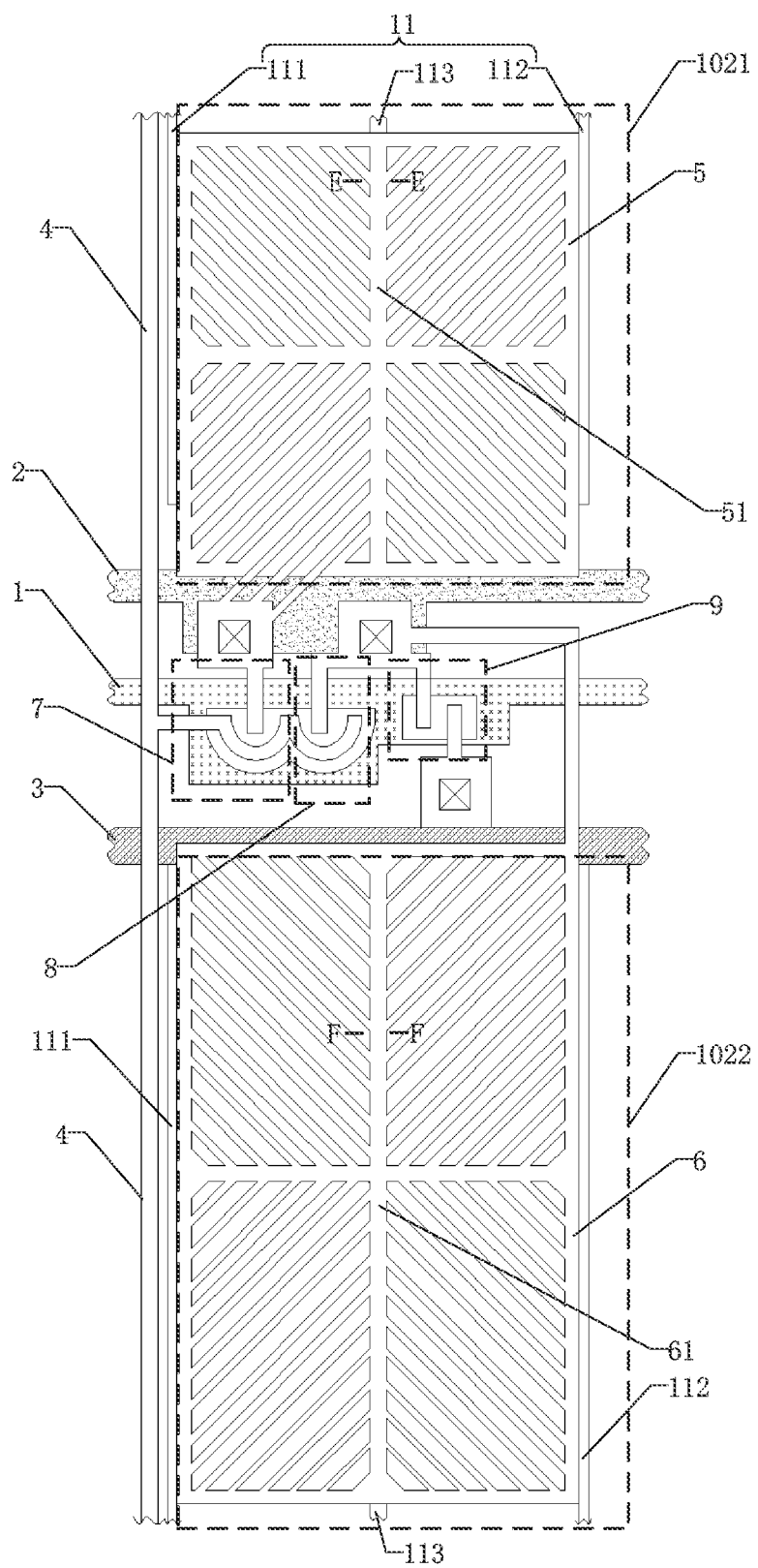
FIG. 10 is a schematic plan view of a pixel unit of an array substrate according to Embodiment 2 of the present disclosure.
Figure 11:
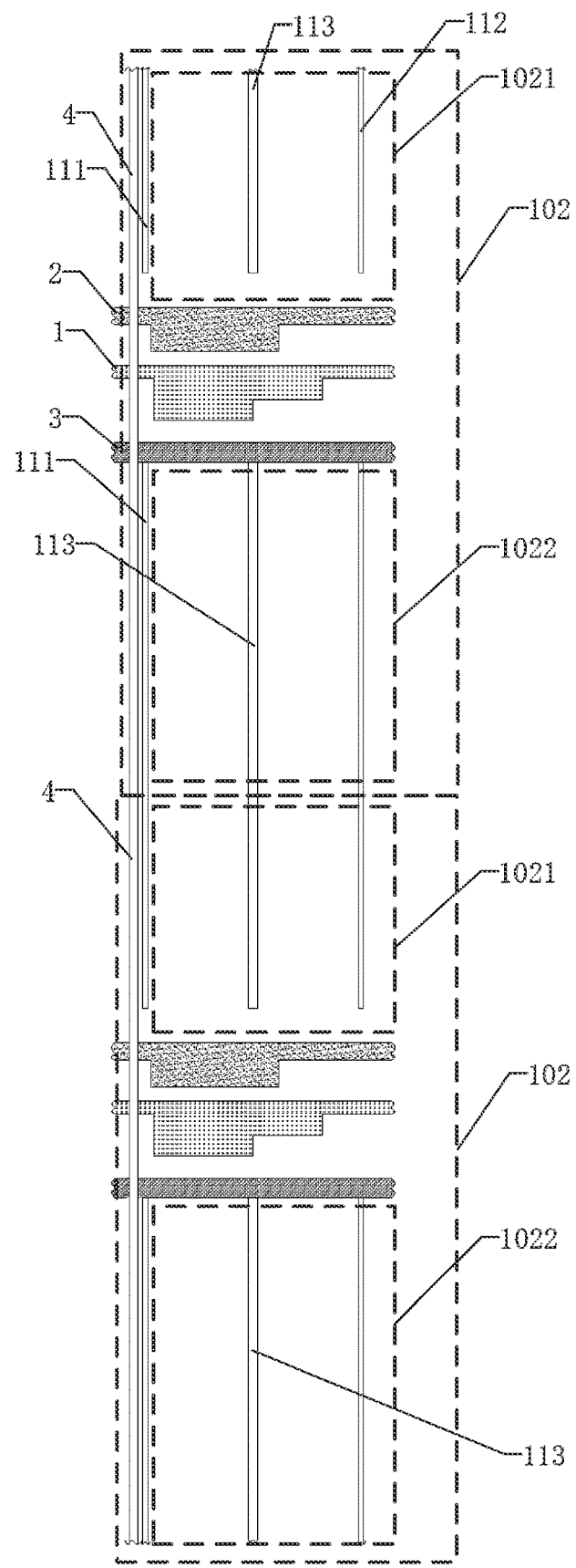
FIG. 11 is a schematic partial plan view of two pixel units of the array substrate according to Embodiment 2 of the present disclosure.

As shown in FIGS. 10 and 11, one end of the second sharing line 11 is electrically connected to a first sharing line 3, and another end of the second sharing line 11 extends from a sub-pixel region 1022 of a pixel unit 102 to a main pixel region 1021 of an adjacent pixel unit 102 along the extension direction of the data line 4. The second sharing line 11 is parallel to the data line and spaced apart from the data line 4. Wherein the second sharing line 11 is arranged in a same layer as the scan line 1, the first common line 2, and the first sharing line 3.

As shown in FIGS. 10 and 11, the second sharing line 11 comprises a first sub-sharing line 111, a second sub-sharing line 112, and a third sub-sharing line 113 spaced apart from each other.

Figure 12:
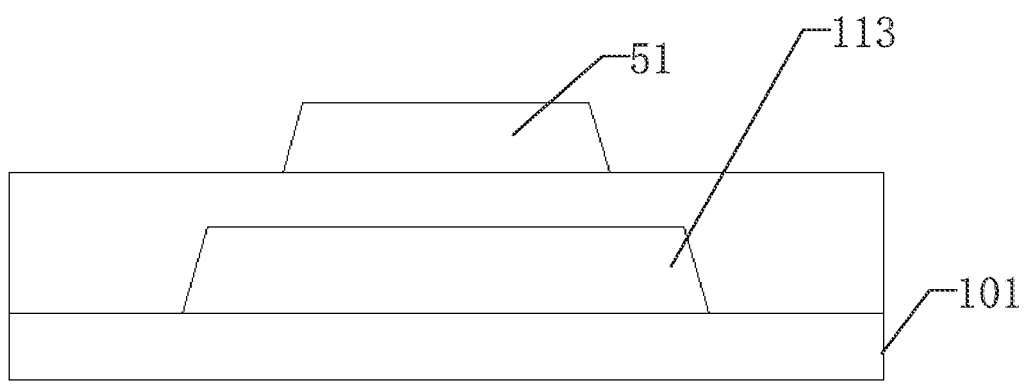
FIG. 12 is a cross-sectional view of E-E in FIG. 10.

As shown in FIGS. 10, 11, and 12, in the main pixel region 1021, the first sub-sharing line 111 is disposed between the main pixel electrode 5 and the data line 4, the second sub-sharing line 112 is disposed on the side of the main pixel electrode 5 away from the data line 4, and the third sub-sharing line 113 is disposed corresponding to the first main electrode 51. In the main pixel region 1021, the first main electrode 51 is stacked on a side of the third sub-sharing line 113 away from the substrate 101. In this way, it is possible to prevent additional occupation of the light transmission area of the array substrate 100 and increase the aperture ratio of the array substrate 100.

Figure 13:
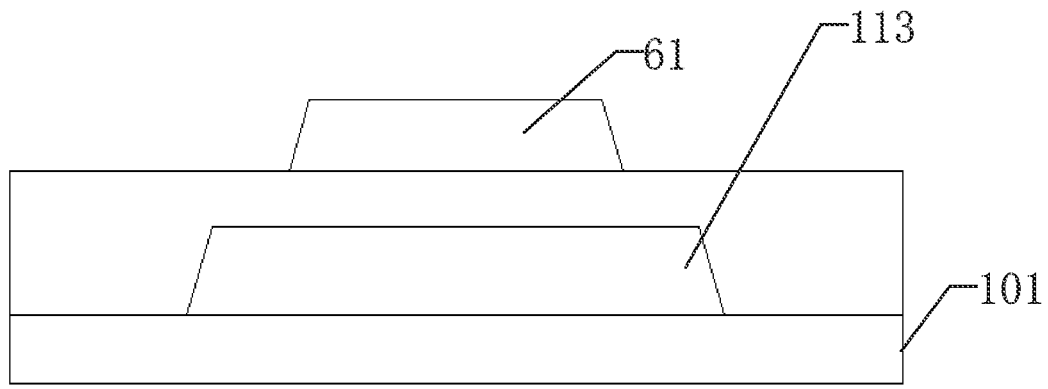
FIG. 13 is a cross-sectional view of F-F in FIG. 10.

As shown in FIGS. 10, 11, and 13, in the sub-pixel region 1022, the first sub-sharing line 111 is disposed between the sub-pixel electrode 6 and the data line 4, and the second sub-sharing line 112 is disposed on the side of the sub-pixel electrode 6 away from the data line 4, and the third sub-sharing line 113 is disposed corresponding to the second main electrode 61. In the sub-pixel region 1022, the second main electrode 61 is stacked on the side of the third sub-sharing line 113 away from the substrate 101. In this way, it is possible to prevent additional occupation of the light transmission area of the array substrate 100 and to increase the aperture ratio of the array substrate 100.

In this embodiment, the first common line 2 and the first sharing line 3 are respectively disposed on two sides of the scan line 1, thereby preventing a situation in the prior art that the first sharing line 100' penetrates the main pixel region 1021 and the sub-pixel region 1022 vertically, and further improves the aperture ratio and transmittance of the pixel units 102. The first common line 2, the first sharing line 3, and the scan line 1 are disposed in a same layer, thereby further improving the transmittance of the pixel units 102.

The above is a detailed introduction to the array substrate and the display panel provided by the present disclosure. Specific examples are used in this article to describe principles and implementations of the present disclosure. The description of the above embodiments is only used to help understand methods and core ideas of the present disclosure. At the same time, for those skilled in the art, according to the ideas of the present disclosure, changes can be made in specific implementations and scope of application. In summary, the contents of this specification should not be understood as a limit to the present disclosure.

What is claimed is:

1. An array substrate, comprising a substrate and a plurality of pixel units arranged on the substrate in an array; wherein each of the pixel units is divided into a main pixel region and a sub-pixel region;
   each of the pixel units comprises:
      a data line disposed between adjacent pixel units;
      a scan line disposed on the substrate and intersecting the data line, and located between the main pixel region and the sub-pixel region;
      a first common line disposed on the substrate and located at a side of the scan line close to the main pixel region and parallel to the scan line;
      a first sharing line disposed on the substrate and located at a side of the scan line close to the sub-pixel region and parallel to the scan line, wherein the first common line, the first sharing line, and the scan line are disposed in a same layer;
      a main pixel electrode disposed in the main pixel region, wherein the main pixel electrode comprises a first main electrode parallel to the data line;
      a sub-pixel electrode disposed in the sub-pixel region, wherein the sub-pixel electrode comprises a second main electrode parallel to the data line;
      a main pixel thin film transistor, wherein a gate of the main pixel thin film transistor is electrically connected to the scan line, a source of the main pixel thin film transistor is electrically connected to the data line, and a drain of the main pixel thin film transistor is electrically connected to the main pixel electrode;
      a sub-pixel thin film transistor, wherein a gate of the sub-pixel thin film transistor is electrically connected to the scan line, a source of the sub-pixel thin film transistor is electrically connected to the data line, and a drain of the sub-pixel thin film transistor is electrically connected to the sub-pixel electrode;
      a sharing thin film transistor, wherein a gate of the sharing thin film transistor is electrically connected to the scan line, a source of the sharing thin film transistor is electrically connected to the drain of the sub-pixel thin film transistor, and a drain of the sharing thin film transistor is electrically connected to the first sharing line; and
      a second common line parallel to the data line, wherein one end of the second common line is electrically connected to the first common line, and another end of the second common line extends from the main pixel region of one of the pixel units to the sub-pixel region of an adjacent pixel unit along an extension direction of the data line,
      wherein the second common line comprises a first sub-common line, a second sub-common line, and a third sub-common line spaced apart from each other;

in the main pixel region, the first sub-common line is disposed between the main pixel electrode and the data line, the second sub-common line is disposed at a side of the main pixel electrode away from the data line, and the third sub-common line is disposed corresponding to the first main electrode;

in the sub-pixel region, the first sub-common line is disposed between the sub-pixel electrode and the data line, the second sub-common line is disposed on a side of the sub-pixel electrode away from the data line, and the third sub-common line is disposed corresponding to the second main electrode.

2. The array substrate according to claim 1, wherein each of the pixel units further comprises:

a second sharing line parallel to the data line, wherein one end of the second sharing line is electrically connected to the first sharing line, and another end of the second sharing line extends from the sub-pixel region of one of the pixel units to the main pixel region of an adjacent pixel unit along an extension direction of the data line.

3. The array substrate according to claim 2, wherein the second sharing line comprises a first sub-sharing line, a second sub-sharing line, and a third sub-sharing line spaced apart from each other;

in the main pixel region, the first sub-sharing line is disposed between the main pixel electrode and the data line, the second sub-sharing line is disposed at a side of the main pixel electrode away from the data line, and the third sub-sharing line is disposed corresponding to the first main electrode;

in the sub-pixel region, the first sub-sharing line is disposed between the sub-pixel electrode and the data line, the second sub-sharing line is disposed at the side of the sub-pixel electrode away from the data line, and the third sub-sharing line is disposed corresponding to the second main electrode.

4. The array substrate according to claim 3, wherein, in the main pixel region, the first main electrode is stacked on a side of the third sub-sharing line away from the substrate; in the sub-pixel region, the second main electrode is stacked on the side of the third sub-sharing line away from the substrate.

5. The array substrate according to claim 2, wherein the scan line is disposed in a same layer with the second sharing line.

6. The array substrate according to claim 1, wherein the scan line is disposed in a same layer with the second common line.

7. The array substrate according to claim 1, wherein, in the main pixel region, the first main electrode is stacked on a side of the third sub-common line away from the substrate; in the sub-pixel region, the second main electrode is stacked on the side of the third sub-common line away from the substrate.

8. A display panel, comprising an array substrate, a color film substrate disposed corresponding to the array substrate, and a liquid crystal layer disposed between the array substrate and the color film substrate;

wherein the array substrate comprises a substrate and a plurality of pixel units arranged on the substrate in an array, and each of the pixel units is divided into a main pixel region and a sub-pixel region;

each of the pixel units comprises:

a data line disposed between adjacent pixel units;

a scan line disposed on the substrate and intersecting with the data line, wherein the scan line is located between the main pixel region and the sub-pixel region;

a first common line disposed on the substrate and located at a side of scan line close to the main pixel region and parallel to the scan line;

a first sharing line disposed on the substrate and located at a side of the scan line close to the sub-pixel region and parallel to the scan line, wherein the first common line, the first sharing line, and the scan line are disposed in a same layer;

a main pixel electrode disposed in the main pixel region, wherein the main pixel electrode comprises a first main electrode parallel to the data line;

a sub-pixel electrode disposed in the sub-pixel region, wherein the sub-pixel electrode comprises a second main electrode parallel to the data line;

a main pixel thin film transistor, wherein a gate of the main pixel thin film transistor is electrically connected to the scan line, a source of the main pixel thin film transistor is electrically connected to the data line, and a drain of the main pixel thin film transistor is electrically connected to the main pixel electrode;

a sub-pixel thin film transistor, wherein a gate of the sub-pixel thin film transistor is electrically connected to the scan line, a source of the sub-pixel thin film transistor is electrically connected to the data line, and a drain of the sub-pixel thin film transistor is electrically connected to the sub-pixel electrode; and a sharing thin film transistor, wherein a gate of the sharing thin film transistor is electrically connected to the scan line, a source of the sharing thin film transistor is electrically connected to the drain of the sub-pixel thin film transistor, and a drain of the sharing thin film transistor is electrically connected to the first sharing line;

a second common line parallel to the data line, wherein one end of the second common line is electrically connected to the first common line, and another end of the second common line extends from the main pixel region of one of the pixel units to the sub-pixel region of an adjacent pixel unit along an extension direction of the data line, wherein the second common line comprises a first sub-common line, a second sub-common line, and a third sub-common line spaced apart from each other;

in the main pixel region, the first sub-common line is disposed between the main pixel electrode and the data line, the second sub-common line is disposed at a side of the main pixel electrode away from the data line, and the third sub-common line is disposed corresponding to the first main electrode;

in the sub-pixel region, the first sub-common line is disposed between the sub-pixel electrode and the data line, the second sub-common line is disposed at a side of the sub-pixel electrode away from the data line, and the third sub-common line is disposed corresponding to the second main electrode.

9. The display panel according to claim 8, wherein each of the pixel units further comprises:

a second sharing line parallel to the data line, wherein one end of the second sharing line is electrically connected to the first sharing line, and another end of the second sharing line extends from the sub-pixel region of one of the pixel units to the main pixel region of an adjacent pixel unit along an extension direction of the data line.

10. The display panel according to claim 9, wherein the second sharing line comprises a first sub-sharing line, a second sub-sharing line, and a third sub-sharing line spaced apart from each other;
- in the main pixel region, the first sub-sharing line is disposed between the main pixel electrode and the data line, the second sub-sharing line is disposed at a side of the main pixel electrode away from the data line, and the third sub-sharing line is disposed corresponding to the first main electrode;
- in the sub-pixel region, the first sub-sharing line is disposed between the sub-pixel electrode and the data line, the second sub-sharing line is disposed at the side of the sub-pixel electrode away from the data line, and the third sub-sharing line is disposed corresponding to the second main electrode.

11. The display panel according to claim 10, wherein, in the main pixel region, the first main electrode is stacked on a side of the third sub-sharing line away from the substrate; in the sub-pixel region, the second main electrode is stacked on the side of the third sub-sharing line away from the substrate.

12. The display panel according to claim 8, wherein, in the main pixel region, the first main electrode is stacked on a side of the third sub-common line away from the substrate; in the sub-pixel region, the second main electrode is stacked on the side of the third sub-common line away from the substrate.

\* \* \* \* \*